United States Patent
Tarpy et al.

(10) Patent No.: US 9,816,644 B2
(45) Date of Patent: Nov. 14, 2017

(54) DUCT STIFFENING DEVICE

(71) Applicants: Paul Tarpy, Santee, CA (US); Broc Kelly, Santee, CA (US); Drew Miles, II, Santee, CA (US)

(72) Inventors: Paul Tarpy, Santee, CA (US); Broc Kelly, Santee, CA (US); Drew Miles, II, Santee, CA (US)

(*) Notice: Subject to any disclaimer, the term of this patent is extended or adjusted under 35 U.S.C. 154(b) by 0 days.

(21) Appl. No.: 15/332,860

(22) Filed: Oct. 24, 2016

(65) Prior Publication Data

US 2017/0037986 A1 Feb. 9, 2017

Related U.S. Application Data

(63) Continuation of application No. 13/951,346, filed on Jul. 25, 2013, now Pat. No. 9,476,525.

(60) Provisional application No. 61/675,629, filed on Jul. 25, 2012.

(51) Int. Cl.
*F16B 35/00* (2006.01)
*F16L 9/04* (2006.01)

(52) U.S. Cl.
CPC .................... *F16L 9/04* (2013.01)

(58) Field of Classification Search
USPC .............. 248/351, 354.1, 354.3, 354.6, 357; 411/384, 388, 389; 138/172, 149, 138/DIG. 4, 89, 96 R, 174
See application file for complete search history.

(56) References Cited

U.S. PATENT DOCUMENTS

| | | | | | |
|---|---|---|---|---|---|
| 1,802,373 | A * | 4/1931 | Byers | ......... | E21B 1/02 248/354.3 |
| 2,004,462 | A * | 6/1935 | Bush | ......... | E04G 11/12 248/354.3 |
| 2,219,169 | A * | 10/1940 | Alter | ......... | B60R 11/04 248/200.1 |
| 3,880,394 | A * | 4/1975 | Wisecarver | ......... | E04G 25/06 211/123 |
| 4,190,223 | A * | 2/1980 | Swanson | ......... | F16L 3/16 248/354.3 |
| 4,249,578 | A * | 2/1981 | Freeman | ......... | F16L 9/003 138/149 |
| 4,449,876 | A * | 5/1984 | Glanton | ......... | B61D 45/001 248/354.3 |
| 6,076,326 | A * | 6/2000 | Gutelius, Jr. | ......... | E04H 9/02 248/499 |
| 6,116,833 | A * | 9/2000 | Ellis | ......... | F24F 13/02 138/172 |
| 6,234,440 | B1 * | 5/2001 | Boney | ......... | A47H 7/00 248/354.1 |
| 6,325,566 | B1 * | 12/2001 | Devine | ......... | G01L 5/161 403/122 |

(Continued)

*Primary Examiner* — Terrell McKinnon
*Assistant Examiner* — Michael McDuffie
(74) *Attorney, Agent, or Firm* — Donn K. Harms

(57) ABSTRACT

A support assembly is provided which is engageable to an as-used position in contact with opposing sidewalls of an air duct to stiffen and increase structural support. The device is engageable between parallel and non parallel sidewalls of ducts through the provision of a support member with pivoting ends configured to engage with the opposing sidewalls. The pivoting ends are in a reverse threaded engagement with opposing ends of the support member whereby rotating the support member will change the length of the assembly.

9 Claims, 4 Drawing Sheets

(56) References Cited

U.S. PATENT DOCUMENTS

| | | | | |
|---|---|---|---|---|
| 6,854,222 B2* | 2/2005 | Hansort | .................. | E04G 21/26 |
| | | | | 248/354.3 |
| 6,901,969 B2* | 6/2005 | Siiter | ...................... | F24F 13/02 |
| | | | | 138/172 |
| 6,957,515 B1* | 10/2005 | Hatfield | .................. | E04F 21/18 |
| | | | | 248/354.3 |
| 7,805,833 B2* | 10/2010 | Toben | ..................... | B21D 39/04 |
| | | | | 254/30 |
| 8,496,217 B2 | 7/2013 | Cerezo Lotina | ........ | E04G 21/26 |
| | | | | 248/351 |
| 2003/0068210 A1* | 4/2003 | Pountney | .............. | F16B 5/0233 |
| | | | | 411/384 |
| 2010/0108849 A1* | 5/2010 | Whittemore | ............ | E04G 21/24 |
| | | | | 248/354.6 |
| 2011/0079698 A1* | 4/2011 | Pezzimenti | ............. | E04G 21/26 |
| | | | | 248/354.5 |
| 2014/0263916 A1* | 9/2014 | Behringer | ............. | E04G 21/243 |
| | | | | 248/357 |

* cited by examiner

DUCT STIFFENING DEVICE

This application is a Continuation of U.S. patent application Ser. No. 13/951,346, filed on Jul. 25, 2013, which claims priority to U.S. Provisional Patent Application No. 61/675,629 filed on Jul. 25, 2012, both of which are incorporated herein in their entirety by this reference thereto.

BACKGROUND OF THE INVENTION

1. Field of the Invention

The present invention relates to duct stiffening devices. More particularly the invention relates to a duct stiffening device having a rotatably engagement end allowing for engagement of the device to ducts having angled opposing sidewalls such as transitions, ogee configurations, and offsets.

2. Prior Art

Heating, ventilation, and air conditioning (HVAC) ductwork has often required the need for reinforcement of the sidewalls to prevent sagging, bulging under pressure and from other forces, and buckling. A conventional solution is to brace opposing sidewalls by engaging a rigid support rod and fastening the ends of the rod through an engagement through the respective sidewall.

There are many examples in prior art, which have tried very different approaches with limited success and consequently the art is still lacking and seeking a solution to the shortcommings noted herein. Examples in prior art include U.S. Pat. No. 6,116,833 to Ellis which teaches a reinforcing tie rod for ducts. Each end has a flange which engages into the opposing walls and is secured thereon to provide reinforcement of the duct.

In a different approach U.S. Pat. No. 6,901,969 to Siiter teaches a plug device which can be engaged to the ends of a conduit. The conduit can then be employed to reinforce a duct by aligning the conduit with holes in the duct, and inserting a bolt through the holes and into internally threaded openings provided on the plugs.

U.S. Pat. No. 4,249,578 to Freeman teaches a length adjustable stiffener for fiberboard ducts. The device includes two telescopically mated tubes having laterally extending end flanges for engaging the inner faces of opposite panels of rectangular fiberboard ducts to brace them against sagging and/or bulging caused by air-pressure-difference and/or gravitational forces.

However, despite the different approaches to solving the problems in the art, a common drawback of these and similar devices are that they are limited to square or rectangular cross sectional duct systems. Further, the prior art is only employable on duct systems which are constant in diameter and therefor which do not taper or transition. Conventional stiffening devices and systems employ fixed angle engagement ends/flanges/plugs and are intended to brace sidewalls which are opposed at 180 degrees. Therefor conventional duct stiffening devices fail to provide a means for reinforcement and stiffening of angled or offset ducts, or curved or transitioning ducts or ducts using an offset stiffening member.

As such, there is a continuing unmet need for a duct stiffening device having ends which accommodate uneven opposing positions, any shaped duct, narrowing and widening walls of ducts, and other requirements for duct stiffening. Such a device should employ rotatably engaged ends interfacing with reinforcing members to allow employment with rectangular, round, square, or narrowing or widening angled ductwork, such as ogee transitions, and offsets.

The forgoing examples of related art and limitation related therewith are intended to be illustrative and not exclusive, and they do not imply any limitations on the invention described and claimed herein. Various limitations of the related art will become apparent to those skilled in the art upon a reading and understanding of the specification below and the accompanying drawings.

SUMMARY OF THE INVENTION

The device herein disclosed and described provides a solution to the shortcomings in prior art of duct supports and stiffeners and achieves the above noted goals through the provision of a duct stiffening device comprising an elongated support member having an axial passage preferably at both ends, although partial passages at opposing ends could be employed. The device, formed to an assembly, is configured for a rotatable engagement of the support member with end members configured to engage with or through the sidewall of a duct to be supported or stiffened.

In accordance with one preferred mode, the rotatable engagement end members are configured as inserts which are removably engageable into the distal ends of an axial passage or relief at both ends of the support member. The proximal ends of the engagement members can include a body portion or fitting configured for frictional engagement within the interior sidewall of the passage of the support member, or frictional adhesive combinations, or mechanical engagement with the duct wall. Other means for engagement of the engagement ends to the support member may be employed, and are anticipated. For example, the proximal end may include an extending threaded portion which operatively engages into a complimentary threaded receiving aperture disposed in the support member and in the sidewall of the duct.

The distal end of the engagement member also includes a threaded portion extending therefrom. In use, the user first forms apertures in the opposing sidewalls of the duct. Then the distal threaded portion extending from the engagement members of both ends of the support member are communicated through the apertures and securely engaged thereon via threaded nut or other suitable fastener.

Rotation of the engagement ends is preferably provided by forming the engagement ends of at least two rotatably engageable portions. The two portions are preferably engaged by a hinge and pin configuration, or a hemispheric rotation between the two, however other means for rotatable engagement may be employed and are anticipated. Thus, the rotational engagement of the two portions forming each engagement ends, which determine a total length of the device to contact the opposing interior sidewall of a duct, allows the distal threaded portion to be rotated to the angle of the opposing faces of duct sidewalls.

This rotational engagement of both ends with their mount to the duct wall, also allows for the ends to be rotated such that the threaded members are parallel to the axis of the duct, during insertion into the duct. This allows the user to configure the device in a length shorter than the mounted length, for an easier installation. A planar engagement surface may also be provided as a contact surface area of the engagement ends of the assembled device which determine the length, against the duct sidewall.

In another mode, the engagement ends and support member may be permanently engaged and unitarily formed.

In yet another mode of the invention, a kit of components is providable to the user comprising different sizes and types of the various components of the invention which allows the user to selectively assemble the device as needed per job application.

With respect to the above description, before explaining at least one preferred embodiment of the herein disclosed invention in detail, it is to be understood that the invention is not limited in its application to the details of construction and to the arrangement of the components in the following description or illustrated in the drawings. The invention herein described is capable of other embodiments and of being practiced and carried out in various ways which will be obvious to those skilled in the art. Also, it is to be understood that the phraseology and terminology employed herein are for the purpose of description and should not be regarded as limiting.

As such, those skilled in the art will appreciate that the conception upon which this disclosure is based may readily be utilized as a basis for designing of other structures, methods and systems for carrying out the several purposes of the present disclosed device. It is important, therefore, that the claims be regarded as including such equivalent construction and methodology insofar as they do not depart from the spirit and scope of the present invention.

As used in the claims to describe the various inventive aspects and embodiments, "comprising" means including, but not limited to, whatever follows the word "comprising". Thus, use of the term "comprising" indicates that the listed elements are required or mandatory, but that other elements are optional and may or may not be present. By "consisting of" is meant including, and limited to, whatever follows the phrase "consisting of". Thus, the phrase "consisting of" indicates that the listed elements are required or mandatory, and that no other elements may be present. By "consisting essentially of" is meant including any elements listed after the phrase, and limited to other elements that do not interfere with or contribute to the activity or action specified in the disclosure for the listed elements. Thus, the phrase "consisting essentially of" indicates that the listed elements are required or mandatory, but that other elements are optional and may or may not be present depending upon whether or not they affect the activity or action of the listed elements.

It is an object of the invention to provide a duct stiffening and reinforcing device with rotational ends which allow for easier insertion and angled positioning of the distal ends of a support member with a duct.

It is another object of the invention to provide such a device with rotational ends which allow for shortening the total length of the assembled support during insertion thereof into a duct.

Yet another object of the invention is the provision of a duct support which is adjustable in final length with either a kit of components of varying lengths or by employing a rotational means to change the total length.

These and objects of the invention will be brought out in the following part of the specification, wherein detailed description is for the purpose of fully disclosing the invention without placing limitations thereon.

BRIEF DESCRIPTION OF DRAWING FIGURES

The accompanying drawings, which are incorporated herein and form a part of the specification, illustrate some, but not the only or exclusive, examples of embodiments and/or features. It is intended that the embodiments and figures disclosed herein are to be considered illustrative rather than limiting. In the drawings.

DETAILED DESCRIPTION OF THE PREFERRED EMBODIMENTS OF THE INVENTION

Figure 1:
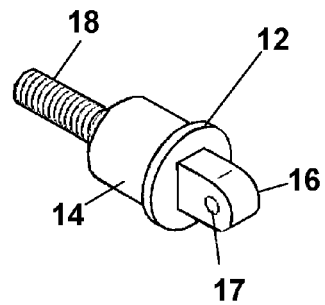
FIG. 1 shows a perceptive view of the first portion of the rotatable engagement ends of the duct stiffening device.

In this description, the directional prepositions of up, upwardly, down, downwardly, front, back, top, upper, bottom, lower, left, right and other such terms refer to the device as it is oriented and appears in the drawings and are used for convenience only; they are not intended to be limiting or to imply that the device has to be used or positioned in any particular orientation.

Figure 2:
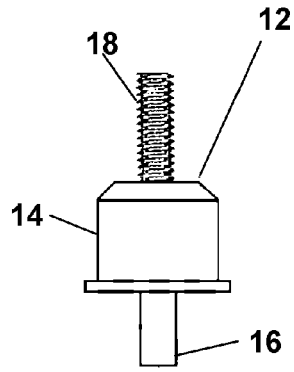
FIG. 2 shows a first side view of the first portion of FIG. 1.
Figure 3:
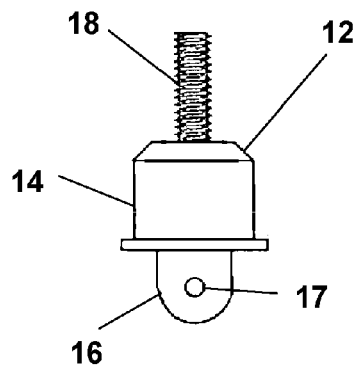
FIG. 3 shows a second side view of the first portion of FIG. 1.
Figure 11:
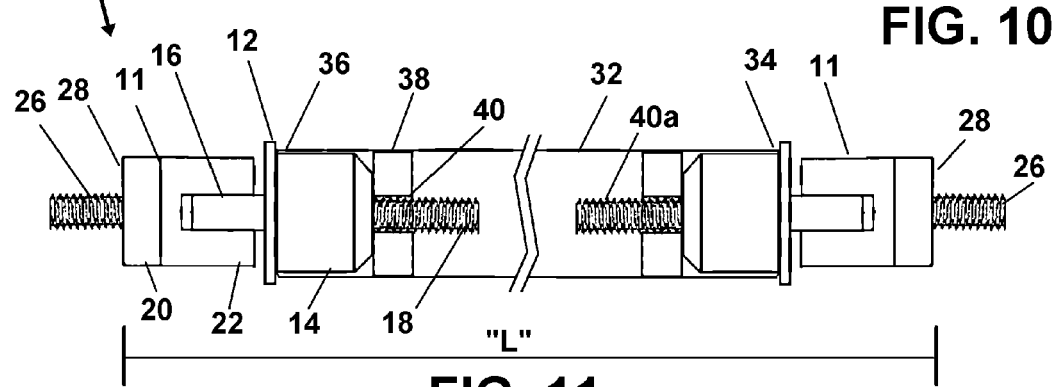
FIG. 11 is a side cross sectional view of an assembly forming the device, showing the engagement ends engaged at opposing respective ends of the elongated support member component, and depicting that the total length "L" of the assembly formed by the components is adjustable between a minimum and maximum length.
Figure 12:
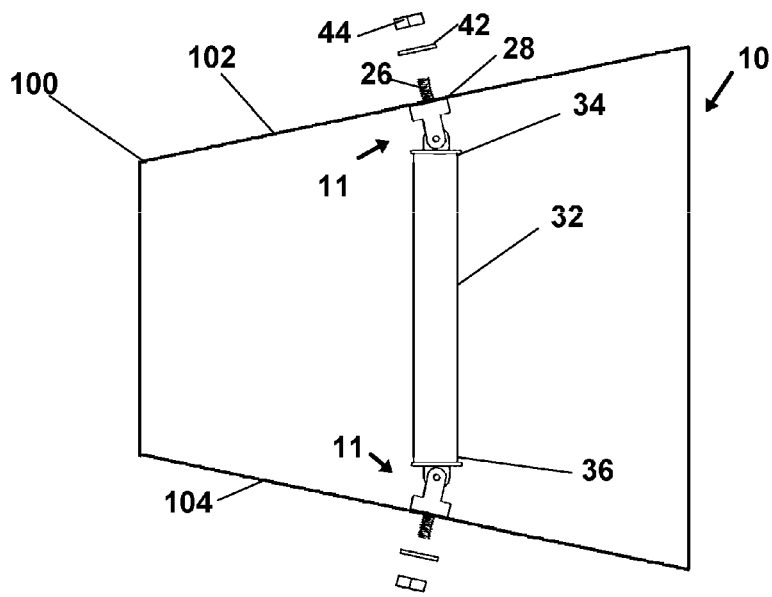
FIG. 12 shows the device in a first as used mode employed to stiffen a tapering angled duct.
Figure 13:
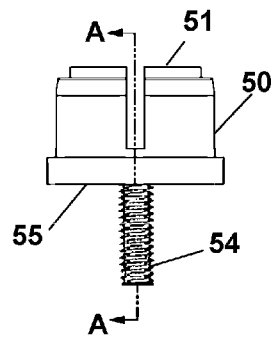
FIG. 13 shows another mode of the device comprising a socket member for forming a ball and socket type rotatable engagement of the engagement ends.
Figure 14:
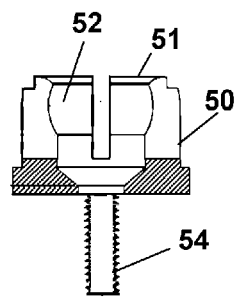
FIG. 14 shows a cross sectional view of the socket member of FIG. 13 along line AA of FIG. 13.
Figure 15:
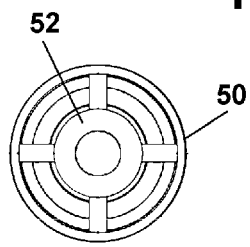
FIG. 15 shows a top view of FIG. 13.
Figure 16:
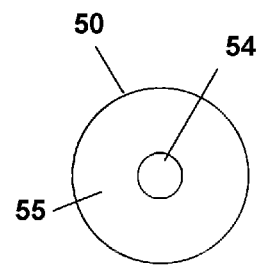
FIG. 16 shows a bottom view of FIG. 13.

Now referring to drawings in FIGS. 1-22, wherein similar components are identified by like reference numerals, there is seen in FIG. 1, FIG. 2, and FIG. 3 views of the first component 12 forming ends for the member 32 of the duct stiffening device 10 assembly shown in an installed mode in FIG. 12. The various components of the device formed to the stiffening assembly defining the device 10 disclosed herein, can be formed of conventional materials such as one or the combination of synthetic plastics and metal however can be formed of any material suitable for the purposes set forth in this disclosure.

In one preferred mode for forming a rotational engagement of the end of a support member 32, forming the ends of the assembly of the device 10 such as in the assembly shown in FIG. 11, an assembled first component 12 is formed of body 14 and preferably having an exterior cross section or circumferential surface configuration at an engagement end, to match the shape or configuration of recesses in both ends of the support member 32 of the assembly forming the device 10 to allow an insertion or engagement therein.

It should be noted that the means for rotational engagement at opposing ends of the member 32 could have recesses which engage around the exterior of the member 32 to mount, or could engage endwalls, however by engaging in axial cavities, a means for adjusting the length of the device 10 provided for the assembly such as the device 10 in FIG. 11. However is such is not desired, then the assembled ends providing rotational engagement of the ends of the member 32 and the sidewall of the duct, can engage an endwall on the member 32 or around the outside circumference of the member 32 in a mode of the device 10 slightly less functional but still rotationally engaged to the duct.

At a first end of the body 14 forming the means for rotational engagement or rotating of the engagement member 11 for the opposing ends of the member 32, there is shown a pivot or hinge which is provided by a first hinge member 16 forming a portion of the means for rotational engagement of the body 14 and a second portion 20 of the first component 12. The hinge member 16 includes an aperture 17 communicating therethrough and is provided to receive a hinge pin 30, shown later. A threaded member 18 is provided at a second end opposite the first end of the first component 12 formed by the body 14, and extends axially a distance past the body 14.

In one preferred mode of the device 10 shown as the assembly in FIG. 11 or 12, the body 14 and hinge member 16 may be unitarily formed by machined metal, or injection molded plastic with the threaded member 18 insert molded thereon, or engaged in secondary operations conventionally performed after the forming of the body 14 and hinge 16.

It is noted and anticipated that although the device is shown in its most simple form, various components and aspects of the device may be differently shaped or slightly modified when forming a device 10 herein. As such those skilled in the art will appreciate the descriptions and depictions and shapes set forth in this disclosure or merely meant to portray examples of preferred modes for rotational or pivoting ends of the assembly within the overall scope and intent of the invention, and are not to be considered limiting in any manner.

Figure 4:
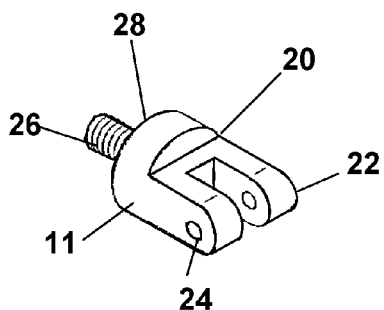
FIG. 4 is a perspective view of the second portion of the rotatable engagement ends of the duct stiffening device.
Figure 5:
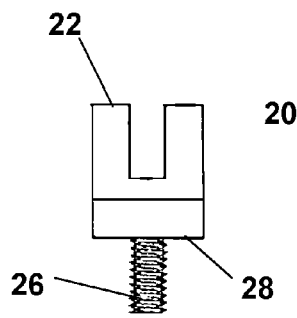
FIG. 5 is a first side view of the second portion of FIG. 4.
Figure 6:
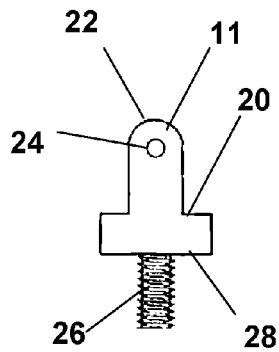
FIG. 6 is a second side view of the second portion of FIG. 4.

The second portion 20 of the engagement member 11 on both ends of the member 32, is shown in FIG. 4, FIG. 5, and FIG. 6. Paired with the first component 12 the means for rotation is provided the assembled engagement members 11. This second portion 20 as shown includes an engagement surface 28 and a complementary second hinge component 22, which when engaged to the first hinge component 16 forms the pivot or hinge providing means for rotational engagement of the ends of the member 32 to the duct such as in FIG. 12.

The second hinge component 22 also includes an aperture 24 which alines with the aperture 17 of the first hinge component 16 for receiving the hinge pin 30. The second portion 20 of the first component 12, also includes a distal threaded member 26 extending therefrom in a direction axially away from the second hinge component 22.

In use to engage the assembly provided by the device 10 with a duct, the threaded member 26 provides a means to engage the device 10 in-between and in a fixed position with opposing sections of a sidewall 102 of a duct 100. The fixed engagement is accomplished by inserting the threaded member 26 through an aperture formed in the sidewall 102 of the duct 104. Thereafter engagement of one or a combination of a washer 42 and nut 44 secures the device 10 in place with engagement surfaces 28 contacting opposing points on the sidewall 102. However, other means for fixed engagement to the duct 104 sidewall 102 may be employed and is considered within the scope of this patent, such as adhesive, or frictional engagement by lengthening the member 32 assembly with the engagement surfaces in contact with the sidewall 102. Currently the aperture and threaded member 26 work well.

The engagement surfaces 28 are preferred to be at least twice the diameter of the threaded member or more, so as to provide a means for sealing the formed aperture in the sidewall 102. Side surfaces of such diameter, when in compressed contact with the sidewall 104, which is provided by one or a combination of engagement of the nut 44 or adjustment of the total length "L," of the assembly forming the device 10, forms a air-proof seal to prevent leakage of air through the smaller aperture in the sidewall 104. This engagement and adjustment preference is shown and described in more detail later and in FIGS. 11 and 12.

Figure 7:
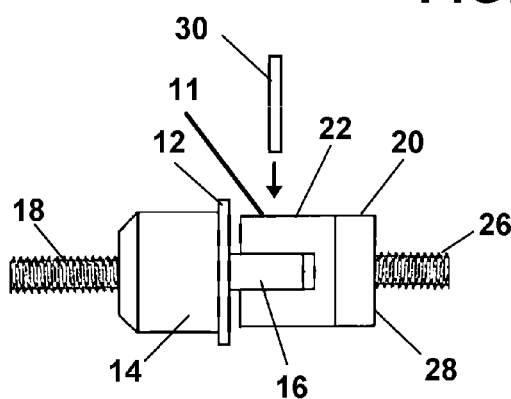
FIG. 7 shows a first side view of the assembled engagement end of the present invention, showing the insertion of a hinge pin.
Figure 8:
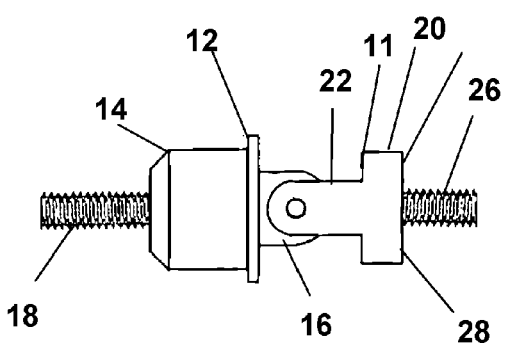
FIG. 8 shows a second side view of the assembled engagement end.

FIG. 7 and FIG. 8 show side views of the assembled device 10 and positioning of the opposing engagement surfaces 28 at respective engagement ends 28 of the device 10. A pivot is provided by the means for rotational engagement which is formed by engagement of a hinge pin 30 through the aligned apertures 17, 24 of the respective hinge components 16, 22 of the first and second portions 12, 20, as shown in the figures. However it is noted that a pivot can be formed by other means for rotational engagement suitable for the intended purpose. One such rotational engagement provides a hemispheric rotation which is shown as the ball portion 58 configured for engagement within the cavity 52 shown in FIGS. 13-20. This provides a hemispheric rotational engagement for the ends of the member 32 to the duct sidewalls allowing for more angles and adjustments. Of course other pivot configurations providing means for rotational engagement which would occur to those skilled in the art and which may be employed without departing from the scope of the invention herein, and as such are anticipated as within the scope of this application.

Figure 9:
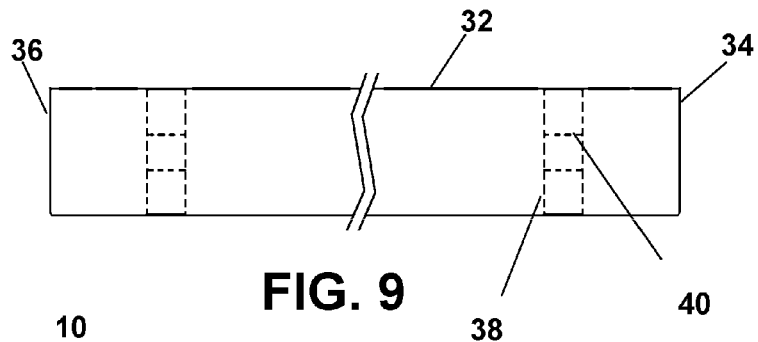
FIG. 9 shows a side view of the elongated support member component of the invention, depicting inset portions having a threaded aperture.
Figure 10:
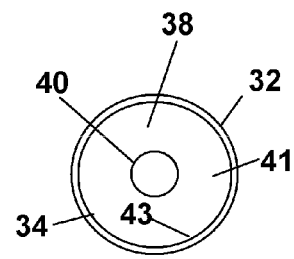
FIG. 10 shows an end view of the support member component.

FIG. 9 and FIG. 10 show side and end views of the support member 32 of the present invention. The support member 32 in the adjustable mode of the assembly such as in FIG. 11, includes a first recess communicating with a first end aperture 34 and a second recess communicating with a second end aperture 36. Optionally, but preferred for weight reduction is shown an axial passage 41 communicating therebetween.

It is noted that the support member 32 is of an unspecified length as the operative length will vary upon application of the invention with a certain duct work. This is an additional reason to employ a member 32 with an axial passage 41 sized for insertion of the rotational engagement ends therein, to thereby allow the member 32 to be cut for size adjustment prior to engagement of the rotational ends.

The support member 32 in the adjustable mode of the assembly of the device 10 as in FIG. 11, includes inserts 38 which are recessed a distance into the respective recesses through the respective first aperture 34 or second aperture 36 at opposing from the respective ends. The inserts 38 both include a respective threaded aperture 40, and 40a, for receiving and engaging with respective threaded members 18, extending from respective body 14 portions.

When employed, the insert 38 may be formed from plastic material or metal, and may be press fit, or be shaped to cooperatively engage within a respective recess which shape is defined by the first aperture 34 and second aperture 36, or the axial passage, or may otherwise securely engaged to prevent rotation. For example, in one mode the insert 38 may be a nut which is welded, frictionally engaged in a complimentary shaped recess, or otherwise engaged into the respective recess at both ends of the support member 32.

However, if the frictional engagement of the two rotational ends in the first aperture 34 and second aperture 36 is sufficient to substantially prevent unwanted rotation, the inserts 38 may not be required, but a cut length of the member 32 of the assembly forming the device 10 as in FIG. 11, in a length to impart compression when mounted, would be advisable to impart a compression against the ends and into the member 32. Increased mounting security is provided using the inserts 38 when such is desired or required, as well as the providing a means for lengthening and shortening the assembly forming the device 10 by twisting the member 32.

The respective threaded apertures 40, and 40a for engagement with the respective threaded members 18, in a mode not providing the length changing means, may be threaded in the same clockwise or counter clockwise pattern, on both ends of the support member 32. Alternatively, in the favored mode of the assembly forming the device 10 as in FIG. 11, which is adjustable for total length "L" of the distance between contact surfaces 28 (FIG. 11), the threaded apertures 40 and 40a are formed on one end of the support member 32 with a clockwise thread and on the other end of the support member 32 in a counter clockwise configuration, to engage threaded members 18 formed with complimentary thread patterns.

This opposing thread direction or pattern of the mated components allows for an adjustment of the total length "L" between the contact surfaces 28 of the assembly shown as the device in FIG. 11, which is formed by the support member 32 and operatively engaged hinge components 16, 22, engaged on both ends, as in FIG. 11. In this configuration, a rotation of the support member 32, such as by the hand, in one direction will shorten the distance or total length, "L," and a rotation in the opposite direction will increase the total length "L" and impart and outward bias of the two contact surfaces 28, against the interior surface of the duct in which the device 10 is engaged. Both ends of the member 32 of the assembly are rotationally engaged with the duct sidewalls.

This rotationally adjustable length mode of the device 10, with reversed complimentary threads noted above, will allow for initial, and subsequent adjustment of the total length "L." For instance the total length "L" could be adjusted longer after engagement with a duct should it become loose or should an outward bias be desired to enhance the seal of the contact surface 28 against the duct interior surface. Or the total length "L" might be initially made shorter to allow for an easier insertion of the assembled device 10 such as in FIG. 11, into a duct, to engage the threaded members 26 through an apertures formed in the sidewall 102 of the duct 104 in a cramped situation.

Thereafter the total length "L" of the assembly forming the device 10, can be adjusted longer by frictionally holding the threaded members 26 in their respective apertures in the sidewall of the duct, and twisting or rotating the support member 32, to lengthen the total length "L" to mounted positions for the contact surfaces 28. Since the threaded members 26 are fixed in position through their respective apertures in the sidewall of the duct by nuts 44, the total length "L" will also thereafter remain fixed.

As noted, FIG. 11 shows a side cross sectional view of the assembly forming the device 10 with a body 14 of the first component engaged into complimentary recesses at each of the respective ends 34, 36, of the support member 32, to yield a total length "L" of the assembly between the two end contact surfaces 28. The contact surfaces 28 as noted are spaced to contact and seal against opposing positions on the interior surface of a duct, in which the device 10 is to be engaged.

Assembly can be accomplished by threading the threaded member 18 into the threaded aperture 40 and 40a of the securely engaged insert 38. However, as noted, in other modes of the invention, the body 14 of the first component 12 may be sized for frictional engagement with the recess defined by the interior sidewall 43 of the support member 32, solely, in a frictional engagement, or in combination with the provision of the threaded engagement of the threaded member 18 and insert 38. In the case of the adjustable mode noted in FIG. 11, a frictional engagement allowing for translation in the recess allows for adjustment of the total length "L" and distance between contact surfaces 28.

FIG. 12 shows an as-used mode of the assembly forming the device 10, in an engaged position within a transition or offset duct 100, with non-parallel sidewalls. The device 10 is employed to add structural rigidity between at least two opposing sidewalls 102, 104, of the duct 100 which extend at angles to each other rather than in parallel planes. Unlike prior art duct stiffening device, the present invention providing a pivot at one or both ends, allows the user to engage the device 10 between non parallel sidewalls and stiffen and support angled sidewalls of such transition, offset, and ogee offset ductwork.

In use, to install the device 10 to an engaged position with a duct, the user drills or otherwise forms apertures in the opposing sidewalls 102, 104 of the duct. The length of the support member 32 is preferably sized to the span at least a portion of the gap between the sidewalls 102, 104, such that the addition of the pivoting end components will position surfaces 28, flush with or slightly biased against, the sidewalls 102 and 104. To that end, the device 10 may be provided as a kit, where a plurality of different pre cut lengths of the support member 32, are provided which when combined with the assembled pivoting component positions the surfaces 28 to positions corresponding to known duct 100 dimensions. However the user may also selectively cut the support member 28 to length per application to yield the desired total length "L" between the contact surfaces 28.

Figure 22:
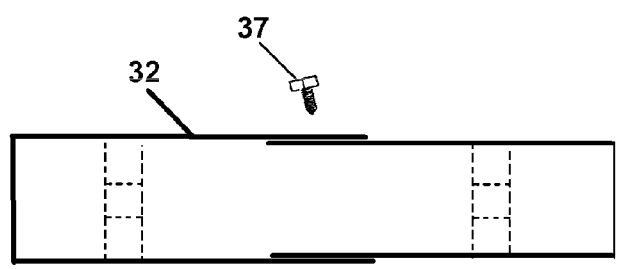
FIG. 22 depicts a telescopically adjustable support member which may be fixed at a length employing means for locking translation of the component members such as a screw and nut or other means.

Still further, as shown in FIG. 22, the support member 32 may be provided as a length-adjustable support member such as a telescopically engaged multiple piece support member 32 which may be secured for a fixed length by a frictional engagement or mechanical engagement such as a screw and nut, communicated through portions of two telescopically engaged portions.

Figure 21:
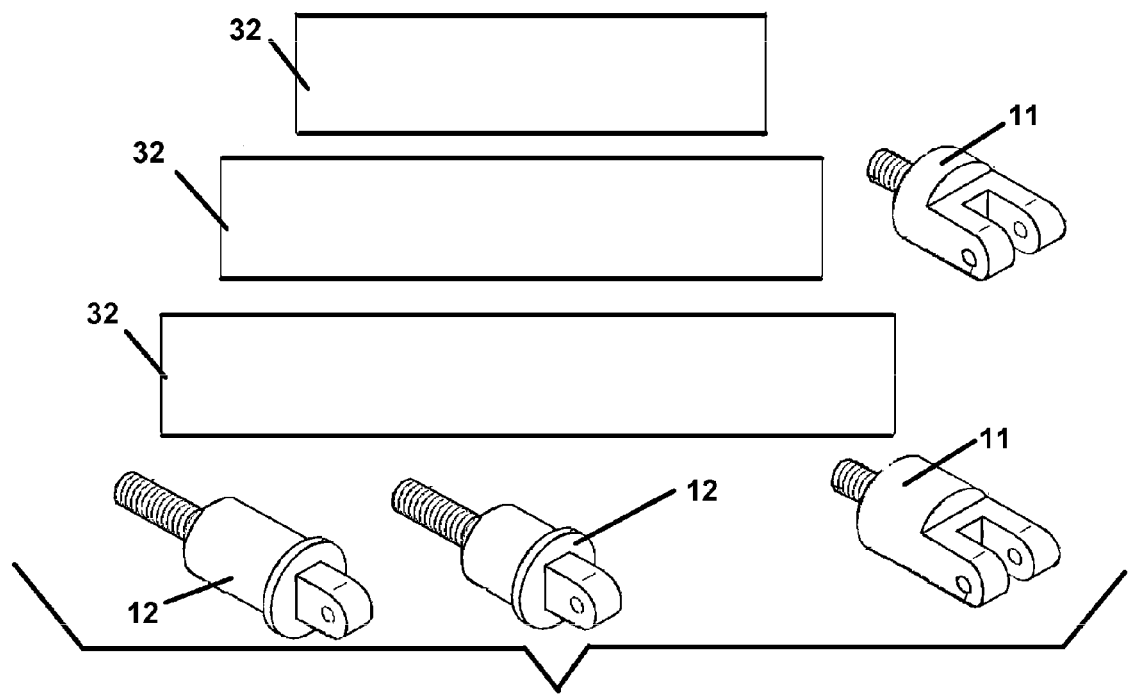
FIG. 21 depicts the device in kit form of the device, for forming different assemblies, featuring a plurality of support members of differing lengths, and a plurality of components for assembly to form a pivoting or hemispherically rotatable end in an assembly of differing lengths.

In another mode of the invention such as shown in FIG. 21, a kit is providable to the user comprising a plurality of components to assemble the pivoting ends for the rotational engagement of any of a plurality of members 32 of various lengths such that when assembled, the assembly forming the device 10 will yield total lengths "L" of the assembly corresponding to known ductwork dimensions. Alternatively, the kit can comprise a plurality of engagement members 11 and a plurality of body 14 portions of differing total lengths, and may or may not be provided with a plurality of support members 32.

The distally located respective threaded members 26 spaced at the distance "L" at the opposing ends of the support members 32 of an assembled device 10, are inserted into the formed apertures in the sidewall of a duct, such that the engagement surfaces 28 are in an abutted contact the interior of the sidewall 102, 104. The device 10 is then secured through one or a combination of washer 42, lock washer, and threaded nut 44. It is noted however that the means for securement of the device 10 may be accomplished by means other than that shown in the figures, and one skilled in the art may readily recognize these, and are anticipated.

Figure 17:
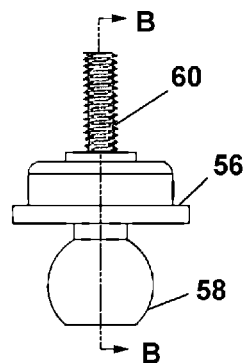
FIG. 17 shows a side view of the ball member for forming a ball and socket type hemispherically rotatable engagement of the engagement ends which may be employed as in FIG. 11.
Figure 18:
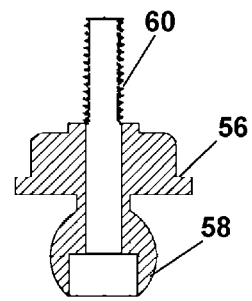
FIG. 18 shows a cross sectional view of the component of FIG. 17 along line BB of FIG. 17.
Figure 19:
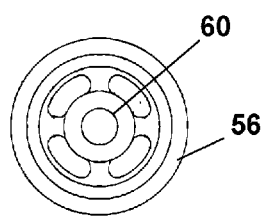
FIG. 19 shows a top view of FIG. 17.
Figure 20:
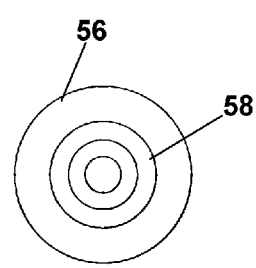
FIG. 20 shows a bottom view of FIG. 17.

FIG. 13-FIG. 20 shows views of yet another preferred mode of the device 10 employing a pivot formed by a ball and socket type engagement which provides for increased diversity in the angle of engagement of an assembled device 10 in ducts having non parallel sidewalls. FIG. 13-FIG. 16 show views of the socket member 50 having a proximal aperture 51 communicating with a cavity 52 for engaging the ball portion 58 of the ball member 56 (FIG. 17). The body of the socket member 50 includes an engagement surface 55 which is similar to the engagement surface 28 of the second portion 20 of the previous modes of the device 10 with the engagement surface abutted engagement with the interior of the sidewall of ductwork. Further there is shown a distal threaded member 54 extending from the socket member 50 and employed for the purposes of the invention set forth earlier.

FIG. 17-FIG. 20 show views of the ball member 56 comprising the ball and socket type of pivot of the current preferred mode of the device 10. The ball member 56 is comprised of a proximal ball portion 58 configured for engagement within the cavity 52 of the socket member 50. The ball portion 58 may be press fit or engaged by other suitable means into the as used ball and socket type engagement with the socket portion 50. Further there is shown a distal threaded member 60 extending therefrom and employed for the purposes of the invention set forth earlier.

FIG. 21 depicts the device 10 as available in kit form with a plurality of support members 32 of differing lengths and a plurality of first components 12 and engagement members 11 of varying lengths which can be provided in such kit form for assembly to the proper length "L". FIG. 22 depicts a telescopically adjustable support member 32 which may be secured with sheet metal screw 37 or other mechanical means to fix the length of the translated sections forming the support member 32.

This invention has other applications, potentially, and one skilled in the art could discover these. The explication of the features of this invention does not limit the claims of this application; other applications developed by those skilled in the art will be included in this invention.

While all of the fundamental characteristics and features of the invention have been shown and described herein, with reference to particular embodiments thereof, a latitude of modification, various changes and substitutions are intended in the foregoing disclosure and it will be apparent that in some instances, some features of the invention may be employed without a corresponding use of other features without departing from the scope of the invention as set forth. It should also be understood that various substitutions, modifications, and variations may be made by those skilled in the art without departing from the spirit or scope of the invention. Consequently, all such modifications and variations and substitutions are included within the scope of the invention as defined by the following claims.

What is claimed:

1. A support assembly comprising:
    said support assembly adapted for engagement to an as-used position in-between and in contact with opposing first and second sidewalls forming a duct defining a conduit for air passage;
    said support assembly comprising:
    an elongated member having an axis extending between a first end and a second end;
    a first pivoting connector having a first end engaged to a second end by a first pivoting connection between said first end and said second end of said first pivoting connector;
    said first end of said first pivoting connector in a first sliding engagement within a first cavity at said first end of said member, said second end of said first pivoting connector adapted for a first engagement with a first mounting position on said first sidewall opposite said second sidewall forming said duct;
    a second pivoting connector having a first end engaged to a second end thereof by a second pivoting connection between said first end and said second end of said second pivoting connector;
    said first end of said second pivoting connector in a second sliding engagement within a second cavity at said second end of said member, said second end of said second pivoting connector adapted for a second engagement with a second mounting position on said second sidewall opposite said first sidewall forming said duct;
    a distance between said first mounting position on said first sidewall and said second mounting position on said second sidewall, defining a length for said support assembly;
    said length of said support assembly being a adjustable by a sliding of either said first end of said first pivoting connector in said first sliding engagement or said first end of said second pivoting connector in said second sliding engagement in said second cavity; and
    said member engageable to said as-used position in-between said opposing sidewalls which are either parallel or non parallel, having said axis of said member running substantially normal to a center axis of said duct.

2. The support assembly of claim 1, additionally comprising:
    said first pivoting connection comprising a first ball and socket;
    said second pivoting connection comprising a second ball and socket.

3. The support assembly of claim 2, additionally comprising:
    said first sliding engagement additionally having a first threaded member extending from said first end of said first pivoting connector being in a first threaded engagement within said first cavity at said first end of said member;

said second sliding engagement additionally having a second threaded member extending from said second end of said second pivoting connector being in a second threaded engagement within said second cavity at said second end of said member; and said length for said support assembly being adjustable by rotation of said member while in said as-used position.

4. The support assembly of claim 1, additionally comprising:

said first pivoting connection comprising a first hinge connecting said first end of said member with said first mounting position on said first sidewall;

said second pivoting connection comprising a second hinge connecting said second end of said member with said second mounting position on said second sidewall.

5. The support assembly of claim 4, additionally comprising:

said first sliding engagement additionally having a first threaded member extending from said first end of said first pivoting connector being in a first threaded engagement within said first cavity at said first end of said member;

said second sliding engagement additionally having a second threaded member extending from said second end of said second pivoting connector being in a second threaded engagement within said second cavity at said second end of said member; and said length for said support assembly being adjustable by rotation of said member while in said as-used position.

6. The support assembly of claim 3, additionally comprising:

said first threaded engagement being a clockwise threaded engagement;

said second threaded engagement being a counterclockwise said second threaded engagement;

rotation of said member while in said first and second threaded engagement in a first direction providing means for increasing said length;

rotation of said member while in said first and second threaded engagement in an opposite direction from said first direction, providing means for decreasing said length; and said length of said support assembly while engaged to said as-used position in-between and in contact with said opposing sidewalls, being adjustable between a minimum said length and a maximum said length by said rotation of said member.

7. The support assembly of claim 5, additionally comprising:

said first threaded engagement being a clockwise threaded engagement;

said second threaded engagement being a counterclockwise said second threaded engagement;

rotation of said member while in said first and second threaded engagement in a first direction providing means for increasing said length;

rotation of said member while in said first and second threaded engagement in an opposite direction from said first direction, providing means for decreasing said length; and said length of said support assembly while engaged to said as-used position in-between and in contact with said opposing sidewalls, being adjustable between a minimum said length and a maximum said length by said rotation of said member.

8. The support assembly of claim 3 additionally comprising:

a first connecting threaded member projecting from a second end of said first pivoting connector opposite said first end thereof;

said first connecting threaded member having a diameter sized to communicate through a first aperture in said first sidewall;

a second connecting threaded member projecting from a second end of said first pivoting connector opposite said first end thereof; and said second threaded connecting member having a diameter sized to communicate through a second aperture in said second sidewall.

9. The support assembly of claim 5 additionally comprising:

a first connecting threaded member projecting from a second end of said first pivoting connector opposite said first end thereof;

said first connecting threaded member having a diameter sized to communicate through a first aperture in said first sidewall;

a second connecting threaded member projecting from a second end of said first pivoting connector opposite said first end thereof; and said second threaded connecting member having a diameter sized to communicate through a second aperture in said second sidewall.

* * * * *